(12) United States Patent
Wu et al.

(10) Patent No.: US 9,807,717 B2
(45) Date of Patent: Oct. 31, 2017

(54) METHOD, APPARATUS, AND SYSTEM FOR SYNCHRONIZATION

(71) Applicant: Huawei Technologies Co., Ltd., Shenzhen (CN)

(72) Inventors: Lichang Wu, Shenzhen (CN); Hu Zhao, Shenzhen (CN)

(73) Assignee: Huawei Technologies Co., Ltd., Shenzhen (CN)

(*) Notice: Subject to any disclaimer, the term of this patent is extended or adjusted under 35 U.S.C. 154(b) by 202 days.

(21) Appl. No.: 14/610,198

(22) Filed: Jan. 30, 2015

(65) Prior Publication Data
US 2015/0139071 A1 May 21, 2015

Related U.S. Application Data

(63) Continuation of application No. PCT/CN2012/079517, filed on Aug. 1, 2012.

(51) Int. Cl.
*H04W 56/00* (2009.01)

(52) U.S. Cl.
CPC ..... *H04W 56/001* (2013.01); *H04W 56/0015* (2013.01)

(58) Field of Classification Search
CPC .................................................. H04W 56/001
See application file for complete search history.

(56) References Cited

U.S. PATENT DOCUMENTS

| | | | | | |
|---|---|---|---|---|---|
| 7,127,632 | B2* | 10/2006 | Takala | ...................... | G06F 1/12 700/1 |
| 7,436,813 | B2* | 10/2008 | Kim | ..................... | H04B 7/2696 370/310 |
| 7,962,145 | B2* | 6/2011 | Gale | ...................... | H01Q 1/246 370/342 |
| 8,896,497 | B1* | 11/2014 | Kullman | .................. | H01Q 1/12 343/882 |
| 9,572,120 | B2* | 2/2017 | Chhabra | ............... | H04W 56/00 |

(Continued)

FOREIGN PATENT DOCUMENTS

| CN | 101473672 A | 7/2009 |
|---|---|---|
| CN | 101511096 A | 8/2009 |

(Continued)

OTHER PUBLICATIONS

"Control Interface for Antenna Line Devices," Antenna Interface Standards Group Standard No. AISG1: Issue 1.1, Jul. 30, 2004, 56 pages.

(Continued)

*Primary Examiner* — Rasheed Gidado
(74) *Attorney, Agent, or Firm* — Slater Matsil, LLP

(57) ABSTRACT

Embodiments of the present invention provide a method, an apparatus, and a system for synchronization. The method includes the following steps executed by a first device: sending clock information acquiring request to a second device through an Antenna Interface Standards Group AISG interface; receiving a clock signal from the second device through the AISG interface; and performing synchronization according to clock information of the clock signal. The first device is a base station and the second device is an antenna line device, or the first device is an antenna line device and the second device is a base station.

17 Claims, 4 Drawing Sheets

(56) References Cited

U.S. PATENT DOCUMENTS

| | | |
|---|---|---|
| 2006/0034250 A1 | 2/2006 | Kim et al. |
| 2006/0075439 A1* | 4/2006 | Vance ............... H04L 29/06027 725/81 |
| 2006/0233132 A1* | 10/2006 | Lee ........................ G04G 5/00 370/328 |
| 2008/0043714 A1 | 2/2008 | Pernu |
| 2009/0086764 A1* | 4/2009 | Lee ........................ H04L 69/28 370/503 |
| 2010/0113097 A1* | 5/2010 | Seeor ................. H04W 88/085 455/562.1 |
| 2011/0105099 A1* | 5/2011 | Roll ..................... H04L 67/025 455/418 |
| 2012/0057865 A1* | 3/2012 | Hasegawa ............. H04J 3/0655 398/16 |
| 2012/0062356 A1 | 3/2012 | Mann et al. |

FOREIGN PATENT DOCUMENTS

| | | |
|---|---|---|
| CN | 101998617 A | 3/2011 |
| CN | 102006661 A | 4/2011 |
| DE | 102009022158 A1 | 11/2010 |
| WO | 2005048624 A1 | 5/2005 |
| WO | 2006133087 A2 | 12/2006 |
| WO | 2008088762 A1 | 7/2008 |

OTHER PUBLICATIONS

Lv, Y., et al., "The Realization of RET Control Unit Based on AISG2.0," Embedded Technology, Nov. 2009, 4 pages.

"Control Interface for Antenna Line Devices," Antenna Interface Standards Group Standard No. AISG v2.0, Jun. 13, 2006, 41 pages.

"IEEE Standard for a Precision Clock Synchronization Protocol for Networked Measurement and Control Systems," IEEE Instrumentation and Measurement Society, IEEE Std 1588-2008, Jul. 24, 2008, 324 pages.

"Common Public Radio Interface (CPRI); Interface Specification," CPRI Specification V4.2, Sep. 29, 2010, 113 pages.

\* cited by examiner

METHOD, APPARATUS, AND SYSTEM FOR SYNCHRONIZATION

This application is a continuation of International Application No. PCT/CN2012/079517, filed on Aug. 1, 2012, which is hereby incorporated by reference in its entirety.

TECHNICAL FIELD

Embodiments of the present invention relate to the field of mobile communications, and in particular, to a method, an apparatus, and a system for synchronization.

BACKGROUND

In a communication process, a mobile communications system generally needs to perform clock synchronization. When a base station in a mobile communications system acquires clock information, generally, a clock needs to be transmitted by installing a global positioning system (GPS, Global Positioning System), or installing a relative global positioning system (RGPS, Relative Global Positioning System), or using a communications network, for example, adopting an IEEE 1588 V2 clock synchronization protocol. A GPS antenna receives a signal and transmits the signal to the base station through a cable, and the clock is recovered through a satellite card. Because signals from more than four GPS satellites need to be received during clock recovery, the GPS antenna needs to be installed at a position with a broad view in the air, and the GPS is connected to the base station through the cable. The RGPS is integrated with an antenna, a satellite card, and a recovery clock (which is equivalent to a time/clock source), and is connected to the base station through the cable. The GPS antenna is directly connected to a satellite card of the base station, and the base station recovers the clock; and the RGPS recovers the clock and is directly connected to the base station.

The GPS antenna needs to be installed at a position with a broad view in the air, and needs a separate cable for connection during the installation; and the RGPS needs to be installed at a position with a broad view in the air, and also needs a separate cable for connection during the installation, thereby resulting in a waste of a cable and complex installation.

SUMMARY

In view of this, embodiments of the present invention provide a method, an apparatus, and a system for synchronization, which do not need an additional separate feeder for connection, thereby saving a cable.

In a first aspect, a method for synchronization is provided, where the method includes the following steps executed by a first device: sending a clock information acquiring request to a second device through an Antenna Interface Standards Group AISG interface; receiving a clock signal from the second device through the AISG interface, where the clock signal carries clock information; and performing synchronization according to the clock information. The first device is a base station and the second device is an antenna line device, or the first device is an antenna line device and the second device is a base station.

In a first possible implementation manner of the first aspect, the method further includes the following steps executed by the first device: before the step of sending a clock information acquiring request to a second device through an AISG interface, sending a device capability acquiring request to the second device through the AISG interface; and receiving device capability information from the second device through the AISG interface, where the device capability information indicates whether the second device is capable of providing the clock information.

In a second aspect, a method for synchronization is provided, where the method includes the following steps executed by a second device: receiving a clock information acquiring request from a first device through an Antenna Interface Standards Group AISG interface; and sending a clock signal to the first device through the AISG interface, where the clock signal carries clock information, so that the first device performs synchronization according to the clock information. The first device is a base station and the second device is an antenna line device, or the first device is an antenna line device and the second device is a base station.

In a first possible implementation manner of the second aspect, the method further includes the following steps executed by the second device: before the step of receiving a clock information acquiring request from a first device, receiving a device capability acquiring request from the first device through the AISG interface; and sending device capability information to the first device through the AISG interface, where the device capability information indicates whether the second device is capable of providing the clock information.

In a third aspect, a first synchronization apparatus is provided and includes: a sending unit, configured to send a clock information acquiring request to a second synchronization apparatus through an Antenna Interface Standards Group AISG interface; a receiving unit, configured to receive a clock signal from the second synchronization apparatus through the AISG interface, where the clock signal carries clock information; and a synchronization unit, configured to perform synchronization according to the clock information.

In a first possible implementation manner of the third aspect, the first synchronization apparatus is a base station and the second synchronization apparatus is an antenna line device, or the first synchronization apparatus is an antenna line device and the second synchronization apparatus is a base station.

In a fourth aspect, a second synchronization apparatus is provided and includes: a receiving unit, configured to receive a clock information acquiring request from a first synchronization apparatus through an Antenna Interface Standards Group AISG interface; and a sending unit, configured to send a clock signal to the first synchronization apparatus through the AISG interface, where the clock signal carries clock information, so that the first synchronization apparatus performs synchronization according to the clock information.

In a first possible implementation manner of the fourth aspect, the first synchronization apparatus is a base station and the second synchronization apparatus is an antenna line device, or the first synchronization apparatus is an antenna line device and the second synchronization apparatus is a base station.

In a fifth aspect, a system for synchronization is provided, where the system includes a first synchronization apparatus and a second synchronization apparatus. The first synchronization apparatus is configured to send a clock information acquiring request to the second synchronization apparatus through an Antenna Interface Standards Group AISG interface, and receive a clock signal from the second synchronization apparatus through the AISG interface, where the clock signal carries clock information, and the first synchronization apparatus performs synchronization according to the clock information. The second synchronization apparatus is configured to receive, through the AISG interface, the clock information acquiring request sent by the first synchronization apparatus, and send the clock signal to the first synchronization apparatus.

In the foregoing solutions, through information interaction between a first device and a second device, clock information is acquired to perform synchronization, so that a clock signal can be transmitted to the first device without using an additional separate feeder for connection, thereby saving a cost of cable connection and installation.

BRIEF DESCRIPTION OF THE DRAWINGS

To describe the technical solutions in the embodiments of the present invention or in the prior art more clearly, the following briefly introduces the accompanying drawings required for describing the embodiments or the prior art. Apparently, the accompanying drawings in the following description show merely some embodiments of the present invention, and a person of ordinary skill in the art may still derive other drawings from these accompanying drawings without creative efforts.

DETAILED DESCRIPTION OF ILLUSTRATIVE EMBODIMENTS

Implementation manners of the present invention are described in the following in detail through specific embodiments and with reference to the accompanying drawings.

In the following, the used terms "clock" and "time" can be used interchangeably, or "clock" may include "time", and "clock information" and "time information" can be used interchangeably; and similarly, "clock source" and "time source" can be used interchangeably, and "clock source information" and "time source information" can be used interchangeably.

Figure 1:
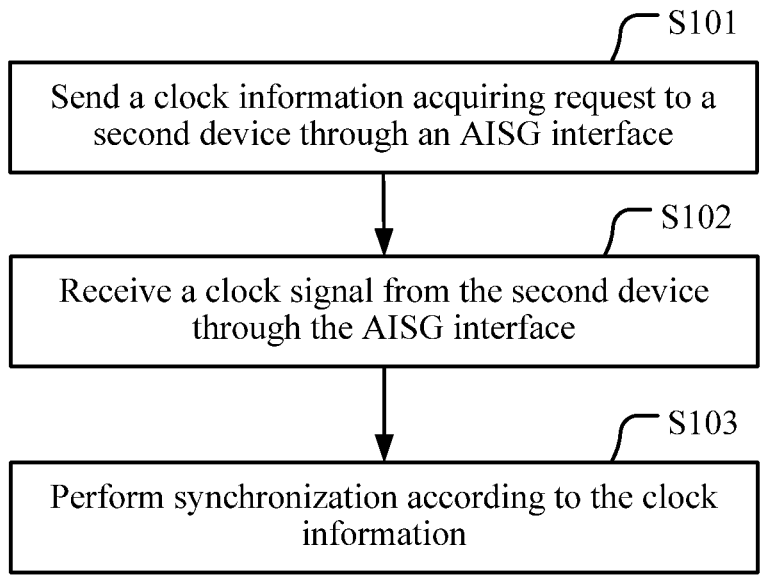
FIG. 1 is a flowchart of a method for synchronization according to an embodiment of the present invention.

An embodiment of the present invention provides a method for synchronization. As shown in FIG. 1, the method may include the following steps executed by a first device.

Step S101: send a clock information acquiring request to a second device through an Antenna Interface Standards Group AISG interface; step S102: receive a clock signal from the second device through the AISG interface, where the clock signal carries clock information; and step S103: perform synchronization according to the clock information, where the first device is a base station and the second device is an antenna line device, or the first device is an antenna line device and the second device is a base station. With this method, clock information of a base station can be transmitted to an antenna line device (ALD, antenna line device) in need, or clock information obtained by an ALD device is transmitted to a base station, so that the clock information can be acquired in a case that a separate cable is not installed, thereby saving costs of a cable and installation.

Figure 2:
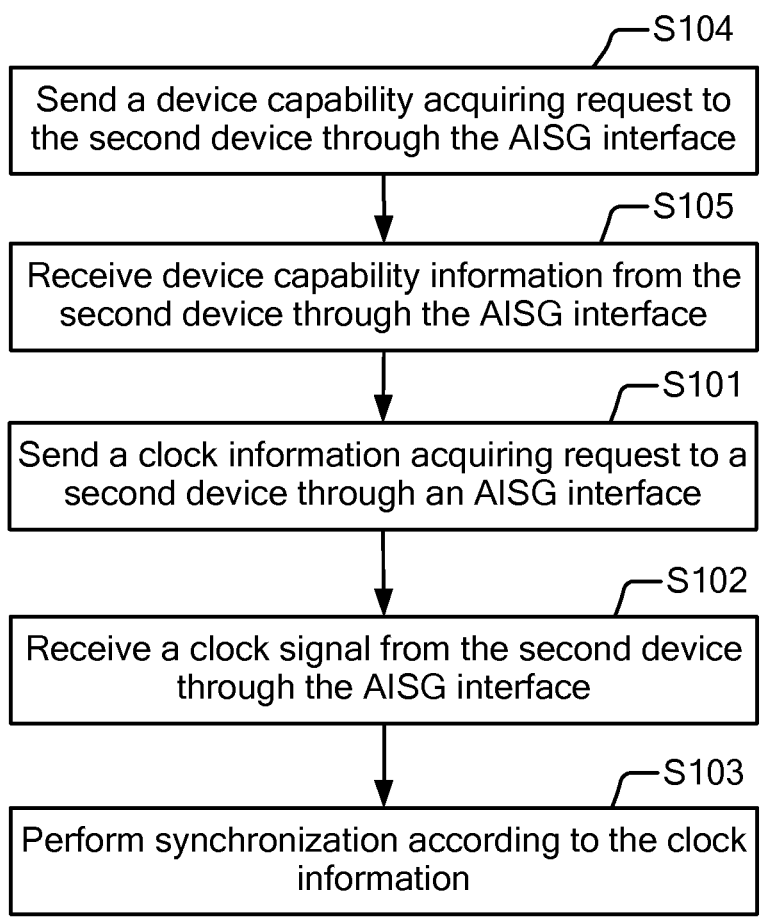
FIG. 2 is a flowchart of a method for synchronization according to another embodiment of the present invention.

As shown in FIG. 2, the method may further include the following steps executed by the first device: before step S101, step S104: send a device capability acquiring request to the second device through the AISG interface; and step S105: receive device capability information from the second device through the AISG interface, where the device capability information is used to indicate whether the second device is capable of providing the clock information. Therefore, the first device may know, in advance, whether the second device is capable of providing the clock information, so as to acquire the clock information of the second device in a case that the second device is capable of providing the clock information.

In the embodiment of the present invention, the first device and the second device are devices that can perform communication based on an AISG standard protocol and according to an extension protocol defined in the present invention, for example, a base station or an ALD device, where the ALD device may be a tower-mounted amplifier, a remote control unit (RCU, Remote Control Unit), or the like. The device capability acquiring request, the device capability information, the clock information acquiring request, and the clock information all may use a newly added command or may use, in an extending manner, an existing command based on the AISG standard protocol, for example, a new field is added, where all newly added/extended commands form an extension protocol of the present invention. The clock information acquiring request may also use a form such as a time query packet or a clock query packet. In the embodiment of the present invention, the clock information may include time information, and a clock source and a time source can be exchanged, that is, both the clock source and the time source can provide the clock information or the time information.

In the foregoing embodiment, the clock signal may be a pulse signal or a group of pulse signals, where the group of pulse signals may carry a time packet. When the clock signal carries a time packet, the time packet may carry the time information; and in this case, after the time packet is acquired, the time information in the time packet is extracted and time synchronization is performed according to the time information, for example, time in the first device or the second device is adjusted to time in the received time packet, where the time information in the time packet may be obtained according to a variety of sources, for example, a GPS, network time, system time, and the like. When the clock information is a pulse signal, clock synchronization may be performed according to the received pulse signal, for example, synchronization is performed according to time of receiving the pulse signal; synchronization is performed immediately once the pulse signal is received, where the pulse signal may be sent at preset time; or synchronization is performed according to information carried in the pulse signal, where the pulse signal may be obtained according to a clock source, or the like, and can provide the clock information more precisely when being compared with the time packet including the time information, thereby reducing an error during clock synchronization.

Optionally, before the step of sending a clock information acquiring request to a second device through an AISG interface, the method may further include the following steps executed by the first device: querying the second device for clock source information through the AISG interface; and receiving the clock source information from the second device through the AISG interface.

The clock source information may be at least one of the following: time at which the clock signal reaches the first device, information about a connecting pin of the first device and the second device, period information, information about whether a time packet is carried, clock source precision information, clock source state information, and a clock information validity mark. The information about the connecting pin of the first device and the second device is used to indicate a pin of the AISG interface used by the first device and the second device to transmit the clock information, the period information is used to indicate a period of sending the clock information, the clock source state information is used to indicate whether the clock source is available, and the clock information validity mark is used to indicate whether the clock information is valid.

The step of receiving a clock signal from the second device through the AISG interface specifically is receiving the clock signal from the second device through the AISG interface at the time at which the clock signal reaches the first device.

Step S101 may specifically include: periodically sending the clock information acquiring request.

A main objective of periodically sending the clock information acquiring request is to avoid a time error of the second device.

Step S103 may specifically include: performing time delay compensation based on the clock information received from the second device, so as to perform clock synchronization, thereby reducing a synchronization error; or performing time synchronization according to the time packet and the clock information validity mark in the received clock information of the second device, so that synchronization may be performed according to the time packet in the received clock information of the second device when the clock information validity mark indicates that the clock information is valid.

It should be noted that, one of the first device and the second device may be a primary device and the other may be a secondary device in all embodiments of the present invention. Generally, the primary device may be a base station or the like, and the secondary device may be an ALD device, such as a tower-mounted amplifier or an RCU.

In this embodiment, when the second device has a clock source or a time source, or the second device is synchronized to an external clock source or time source, the device capability information indicates whether the second device is capable of providing the clock information. Optionally, the clock information from the second device is periodically received. Optionally, the clock information from the second device is received at preset time. Optionally, the clock information from the second device is sent in a manner of broadcasting. According to an implementation manner, the method may further include: after step S103, sending acknowledgement information to the second device.

In the embodiment of the present invention, a primary device and a secondary device implement synchronization by transmitting clock information through an AISG interface without separately installing a cable, thereby reducing a cost and facilitating device installation and maintenance. If an ALD device does not have a time source, the ALD device may obtain time information from a base station through the AISG interface, so as to conveniently record occurrence time of a fault and the like, thereby improving maintainability of a device.

The method for synchronization provided in the embodiment of the present invention is further described in the following through several more specific embodiments.

Figure 3A:
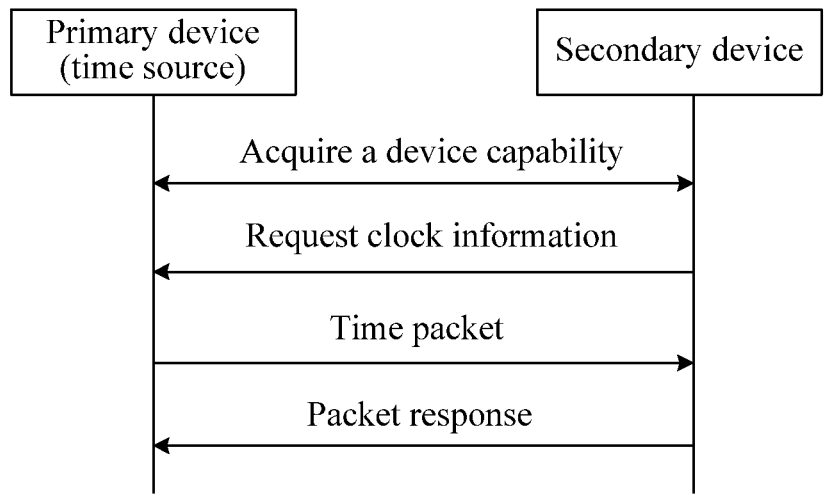
FIG. 3a and FIG. 3b are schematic diagrams of a communication process between a first device and a second device in an implementation manner of a method for synchronization according to an embodiment of the present invention.
Figure 3B:
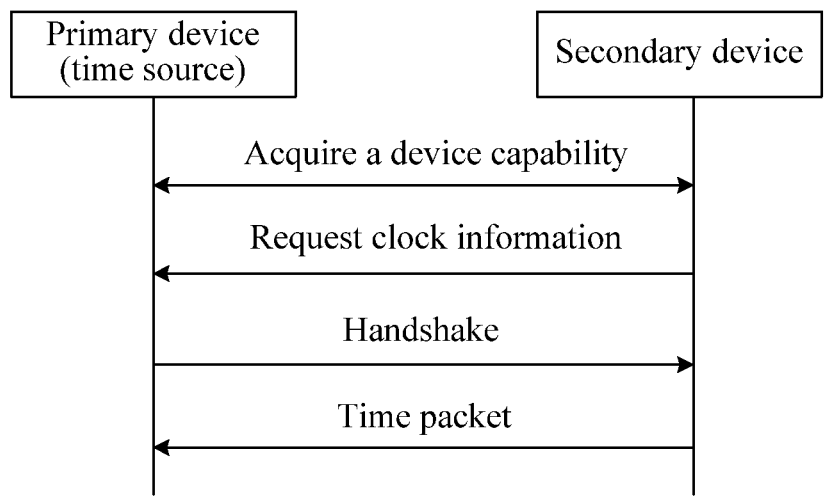

As shown in FIG. 3a and FIG. 3b, when a primary device has a clock source and is capable of providing clock information while a secondary device itself does not have a clock source and needs to acquire clock information from the primary device, the secondary device may send a clock information acquiring request and notify the primary device that the secondary device has a demand for acquiring time, so as to acquire the time. Specifically, the primary device may know, through a process of interaction with the secondary device, whether the secondary device needs clock information. The process may be dominated by the primary device. The primary device first initiates a capability query to the secondary device and then performs a corresponding response to a capability of the secondary device; then, the secondary device extends an information field definition corresponding to the capability of the secondary device, and sends a clock information acquiring request; and after receiving the clock information acquiring request from the secondary device, the primary device having a time source sends a time packet and transmits the time packet to the secondary device. The time packet may use a newly added command, or may use an existing command in an extending manner. After receiving the time packet from the primary device, the secondary device may synchronize local time for use in operation or use in fault recording. In order to avoid an error in the time acquired by the secondary device, the primary device may periodically send the time packet to the secondary device.

When a primary device itself does not have a time source while a secondary device has a time source, the primary device may be notified that the secondary device is capable of providing clock information. Specifically, the primary device may know, through an interaction process, whether the secondary device has a capability to provide clock information; and then after knowing that the secondary device has the time source, the primary device that does not have a time source may send a clock information acquiring request in the form of a time query packet to the secondary device, and the secondary device returns a time packet. The time packet may use a new command, or may use an existing command in an extending manner (for example, a receive ready frame RR frame). After receiving the time packet, the primary device may synchronize local time for use in operation or use in fault recording. In order to avoid an error in the time acquired by the primary device, the secondary device may periodically send the time packet. Optionally, for a primary device having a time source or multiple secondary devices having a time source, the primary device may selectively use a time source of a secondary device according to clock source precision information.

Another embodiment in which clock information is transmitted through an AISG interface is described in the following.

When a primary device itself does not have a clock source while a secondary device has a clock source, clock information may be transmitted by using a separate line or using an unused pin (PIN) line in an AISG cable (definitions of PINs in the AISG cable are shown in Table 1), for example, a reserved pin 8 and a pin 2 that is not frequently used. When an AISG transmission distance is short, the clock information may be transmitted by using one cable (the reserved PIN 8). When the AISG transmission distance is long, the clock information may be transmitted by using two cables in a manner of a differential signal.

An AISG interface may adopt a manner of an RS485 half-duplex primary-secondary communication and supports multiple secondary devices. Because of the manner of half-duplex communication, in order to avoid a bus conflict, a manner in which the primary device periodically sends a clock information acquiring request and the secondary device makes a response may be adopted to perform communication. Although a cable with an AISG interface includes multiple PINs, because most of the pins are used for power supply, an actually used cable does not support a standard 8 PIN and even only a 5 PIN is used. Therefore, another optional solution is to directly use an existing cable of an AISG cable.

TABLE 1

| Pin number | Signal | Description |
| --- | --- | --- |
| 1 | +12 V DC rated | |
| 2 | −48 V DC rated | Optional |
| 3 | RS485 B | |
| 4 | RS485 grounding | Optional; to be isolated from a DC grounding cable and the ground |
| 5 | RS485 A | |
| 6 | +24 V DC rated | |
| 7 | DC grounding cable | Not grounded, and used for an RET unit |
| 8 | N/C | Reserved |

A shield braid of a cable should be connected to a grounding portion of an ALD through a connecting housing.

The clock information may be a pulse signal, and may be a group of pulse signals carrying a time packet; and the clock information may be periodical and is not limited to 1PPS (a pulse signal per second). Time delay compensation for the clock information between the primary device and the secondary device may be automatically measured and adjusted, or may be manually set.

Figure 4A:
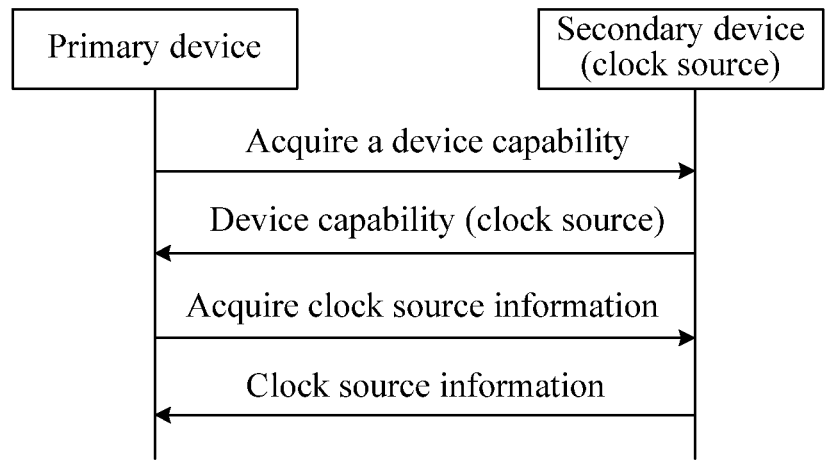
FIG. 4a to FIG. 4c are schematic diagrams of a communication process between a first device and a second device in another implementation manner of a method for a synchronization according to an embodiment of the present invention.

Specifically, as shown in FIG. 4a, a primary device may be notified, through an interaction process in which the primary device acquires a capability of a secondary device, that the secondary device has a clock source; further, the primary device may acquire clock source information of the secondary device; and optionally, the clock source information may include PIN information, period information, information about whether a time packet is carried, clock precision, a clock source state, and the like.

After receiving the clock source information (the clock source state is available), the primary device may synchronize a local clock according to the clock source information. Optionally, if the clock source information carries a time packet, the time packet may be extracted, and local time is synchronized according to the time packet; or if the clock source information does not carry a time packet, the primary device may re-send a clock information acquiring request to the secondary device, so as to query the secondary device for time.

The secondary device may notify the primary device that the secondary device has the clock source. Specifically, a field definition related to the capability of the secondary device may be extended and a feature of the clock source may be supplemented through the interaction process in which the primary device acquires the capability of the secondary device; further, the primary device may acquire the clock source information of the secondary device; and optionally, the clock source information may include at least one of the following: period information, information about whether a time packet is carried, clock source precision, a clock source state, and the like.

When the clock source of the secondary device is unavailable, the primary device may periodically send the clock information acquiring request until the clock source of the secondary device is available. After the clock source of the secondary device is available, the clock source information reported by the secondary device may further include arrival time of a clock signal, so that when the primary device does not synchronize a clock, the primary device may acquire the arrival time of the clock signal of the secondary device. Before the clock signal arrives, the primary device sends a time query packet in advance to the secondary device having the clock source. Because OOK-RS485 transformation and receiving and transmitting transformation in a signal modulation mode of an AISG interface affect clock precision, the primary device needs to consider a lead during delivery.

The secondary device may send a time packet at preset time, for example, a clock information point, where the time packet may carry a clock information validity mark, which can be implemented through hardware, a logic circuit, or the like. After receiving the time packet, the primary device may perform clock synchronization according to receiving time and the clock information validity mark.

Figure 4B:
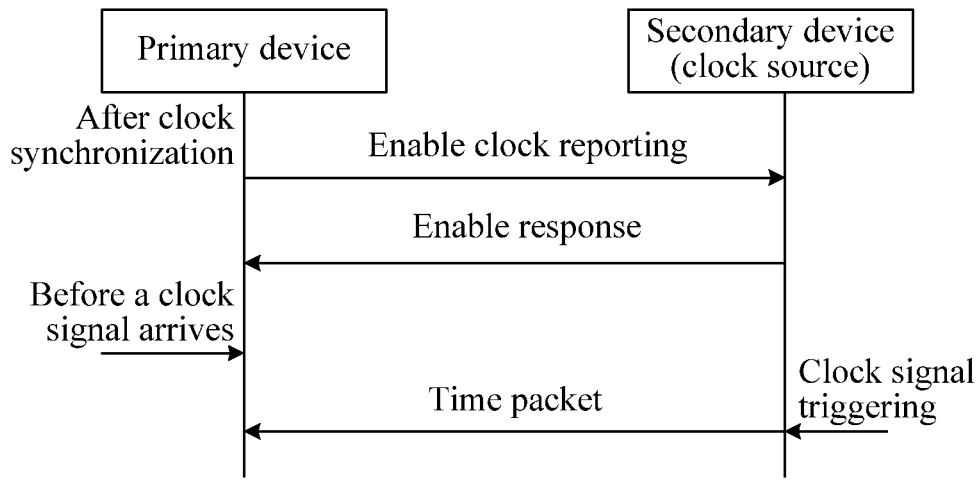

Alternatively, the primary device may also enable the secondary device to actively report sending time of the clock signal. When receiving the clock signal, the primary device may not send a clock information acquiring request in the form of a time query packet, and meanwhile, do not perform an operation on another secondary device to avoid AISG interface signal crosstalk caused by sending of the another secondary device, but directly receive a time packet actively reported by the secondary device, as shown in FIG. 4b.

When a primary device has a clock source and a secondary device itself does not have a clock source, clock information may be transmitted by using a separate line; and when the secondary device itself does not have the clock source, the secondary device may send a clock information acquiring request to the primary device and notify the primary device that the secondary device has a clock demand. Specifically, the primary device may acquire, through a process of interaction with the secondary device, whether the secondary device needs clock information; further, the primary device sends clock source information to the secondary device; and optionally, the clock source information may include at least one of the following: PIN information, period information, information about whether a time packet is carried, clock source precision, a clock source state, and the like.

After receiving the clock source information (the clock source state is available), the secondary device may synchronize a local clock according to the clock source information. Optionally, if the clock source information carries a time packet, the time packet may be extracted, and local time is synchronized according to the time packet.

Figure 4C:
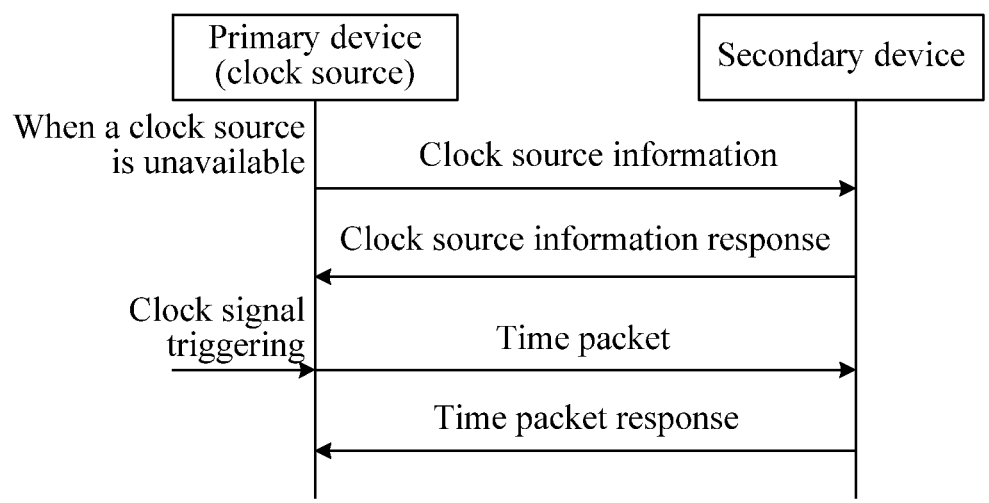

Optionally, the clock information may be transmitted by directly using an existing cable of an AISG interface; and when the secondary device itself does not have the clock source, the secondary device may send a clock information acquiring request to the primary device to notify the primary device that the secondary device has the clock demand. Specifically, the primary device may acquire, through the process of interaction with the secondary device, whether the secondary device needs the clock information; further, the primary device may send clock source information to the secondary device; and optionally, the clock source information may include at least one of the following: PIN information, period information, information about whether a time packet is carried, clock source precision, a clock source state, and the like. As shown in FIG. 4c, when the clock source of the primary device is unavailable, the primary device may periodically send the clock source information until the clock source of the primary device is available, and then the secondary device sends clock source information ACK to the primary device and further acquires time packet information.

After the clock source of the primary device is available, the primary device may send a time packet at preset time, for example, a clock information point, where the time packet may carry a clock information validity mark, which can be implemented through hardware, a logic circuit, or the like. After receiving the time packet, the secondary device may perform clock synchronization according to receiving time and the clock information validity mark. In order to support that multiple secondary devices request clock information, the primary device may broadcast a time packet, and in this case, the secondary device does not return an ACK packet.

Figure 5:
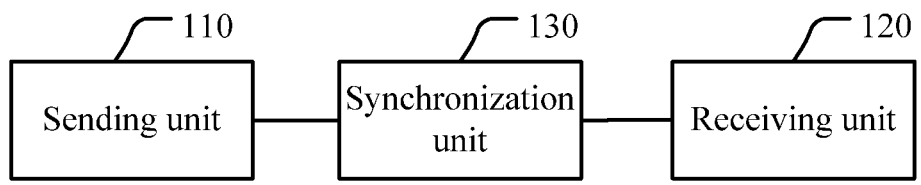
FIG. 5 is a structural block diagram of a first synchronization apparatus for synchronization according to an embodiment of the present invention.

An embodiment of the present invention further provides a first synchronization apparatus for performing synchronization. As shown in FIG. 5, the first synchronization apparatus includes a sending unit 110, configured to send a clock information acquiring request to a second synchronization apparatus through an Antenna Interface Standards Group AISG interface; a receiving unit 120, configured to receive a clock signal from the second synchronization apparatus through the AISG interface, where the clock signal carries clock information; and a synchronization unit 130, configured to perform synchronization according to the clock information.

Optionally, the first synchronization apparatus is a base station and the second synchronization apparatus is an antenna line device, or the first synchronization apparatus is an antenna line device and the second synchronization apparatus is a base station. In this embodiment, the first synchronization apparatus can acquire the clock information from the second synchronization apparatus in a case that a separate cable is not used for installation, thereby saving costs of a cable and installation, and can further transmit clock information of a base station to an ALD device in need, so as to use the clock information of the base station as time information of, for example, operation recording and fault handling.

Preferably, the sending unit 110 is further configured to send a device capability acquiring request to the second synchronization apparatus through the AISG interface; and the receiving unit 120 is further configured to receive device capability information from the second synchronization apparatus through the AISG interface, where the device capability information indicates whether the second synchronization apparatus is capable of providing the clock information.

In this embodiment, that the receiving unit 120 receives the clock signal from the second synchronization apparatus may specifically be: receiving a pulse signal or a group of pulse signals from the second synchronization apparatus, where the group of pulse signals carries a time packet.

Optionally, the sending unit 110 is further configured to send a clock source information query request to the second synchronization apparatus through the AISG interface; and the receiving unit 120 is further configured to receive clock source information from the second synchronization apparatus through the AISG interface.

The clock source information may be at least one of the following: time at which the clock signal reaches the first synchronization apparatus, information about a connecting pin of the first synchronization apparatus and the second synchronization apparatus, period information, information about whether a time packet is carried, clock source precision information, clock source state information, and a clock information validity mark.

Optionally, the receiving unit 130 is specifically configured to receive the clock signal from the second synchronization apparatus through the AISG interface at the time at which the clock signal reaches the first synchronization apparatus.

Optionally, the synchronization unit 130 is specifically configured to perform time delay compensation based on the clock information received from the second synchronization apparatus, so as to perform clock synchronization; or perform time synchronization according to the time packet and the clock information validity mark in the received clock information of the second synchronization apparatus.

Figure 6:
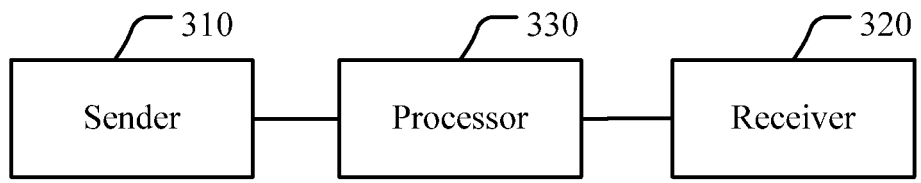
FIG. 6 is a structural block diagram of another first synchronization apparatus for synchronization according to an embodiment of the present invention.

It should be noted that, the units of the foregoing first synchronization apparatus may be existing circuit modules or processors, for example, a structure of the first apparatus may be shown in FIG. 6, and includes a sender 310, a processor 330, and a receiver 320 that are configured to execute functions of the sending unit 110, the synchronization unit 130, and the receiving unit 120 in the foregoing embodiment respectively, and details are not described herein again.

Figure 7:
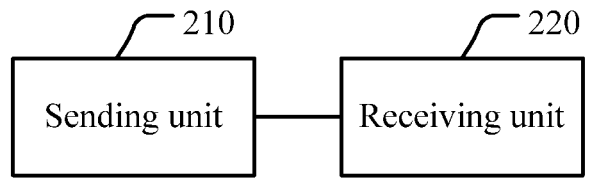
FIG. 7 is a structural block diagram of a second synchronization apparatus for synchronization according to an embodiment of the present invention.
Figure 8:
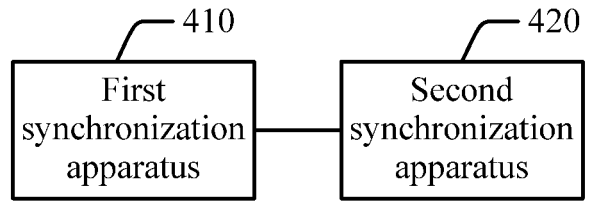
FIG. 8 is a structural diagram of a system for synchronization according to an embodiment of the present invention.

The present invention further provides a second synchronization apparatus for synchronization. As shown in FIG. 7, the second synchronization apparatus includes a receiving unit 220, configured to receive a clock information acquiring request from a first synchronization apparatus through an Antenna Interface Standards Group AISG interface; and a sending unit 210, configured to send a clock signal to the first synchronization apparatus through the AISG interface, where the clock signal carries clock information, so that the first synchronization apparatus performs synchronization according to the clock information.

The first synchronization apparatus is a base station and the second synchronization apparatus is an antenna line device, or the first synchronization apparatus is an antenna line device and the second synchronization apparatus is a base station.

In this embodiment, the second synchronization apparatus can provide the clock information for the first synchronization apparatus in a case that a separate cable is not used for installation, thereby saving costs of a cable and installation, and can further transmit clock information of a base station to an ALD device in need, so as to use the clock information of the base station as time information of, for example, operation recording and fault handling.

Preferably, the receiving unit 220 is further configured to receive a device capability acquiring request from the first synchronization apparatus through the AISG interface; and the sending unit 210 is further configured to send device capability information to the first synchronization apparatus through the AISG interface, where the device capability information indicates whether the second device is capable of providing the clock information.

In this embodiment, that the sending unit sends the clock signal to the first synchronization apparatus specifically is: sending a pulse signal or a group of pulse signals, where the group of pulse signals carries a time packet.

Optionally, the receiving unit is further configured to receive, through the AISG interface, a clock source information query request sent by the first synchronization apparatus; and the sending unit is further configured to send clock source information to the first synchronization apparatus through the AISG interface.

The clock source information may be at least one of the following: time at which the clock signal reaches the first synchronization apparatus, information about a connecting pin of the first synchronization apparatus and the second synchronization apparatus, period information, information about whether a time packet is carried, clock source precision information, clock source state information, and a clock information validity mark.

An embodiment of the present invention further provides a system for synchronization. As shown in FIG. 7, the system includes a first synchronization apparatus 410 and a second synchronization apparatus 420. The first synchronization apparatus 410 is configured to send a clock information acquiring request to the second synchronization apparatus 420 through an Antenna Interface Standards Group AISG interface, and receive a clock signal from the second synchronization apparatus 420 through the AISG interface, where the clock signal carries clock information, and the first synchronization apparatus 410 performs synchronization according to the clock information. The second synchronization apparatus 420 is configured to receive, through the AISG interface, the clock information acquiring request sent by the first synchronization apparatus 410, and send the clock signal to the first synchronization apparatus 410. The first synchronization apparatus is a base station and the second synchronization apparatus is an antenna line device, or the first synchronization apparatus is an antenna line device and the second synchronization apparatus is a base station.

It should be noted that the first synchronization apparatus and the second synchronization apparatus in this embodiment may be the first synchronization apparatus and the second synchronization apparatus in the embodiments corresponding to FIG. 5 to FIG. 7.

Through the foregoing description about the implementation manners, a person skilled in the art may clearly understand that the present invention may be implemented through hardware or firmware or a combination of them. When the present invention is implemented through software, the foregoing functions may be stored in a computer readable medium or used as one or more instructions or codes on a computer readable medium for transmission. The computer readable medium includes a computer storage medium and a communication medium, where the communication medium includes any medium facilitating transmission of a computer program from one place to another place. The storage medium may be any available medium that can be accessed by a computer. The following is an example but is not limited thereto: The computer readable medium may include a RAM, a ROM, an EEPROM, a CD-ROM, or another optical disc storage, a magnetic disk storage medium, or another magnetic storage device, or another any medium that can be used for carrying or storing a desired program code with an instruction or a data structure form and can be accessed by a computer. In addition, any connection may properly become a computer readable medium. For example, if software is transmitted from a website, a server, or anther remote source by using a coaxial cable, an optical fiber and cable, a twisted pair, a digital subscriber line (DSL), or by using wireless technologies such as infrared ray, radio, and microwave technologies, the coaxial cable, the optical fiber and cable, the twisted pair, the DSL, or the wireless technologies such as infrared ray, radio, and microwave technologies are included in definitions of mediums to which they belong. As used in the present invention, a disk (Disk) and a disc (disc) include a compact disc (CD), a laser disc, an optical disc, a digital versatile disc (DVD), a floppy disk, and a Blu-ray disc, where the disk is usually used for magnetically replicating data, while the disc is used for optically replicating data by using laser. The foregoing combination should also be included in the protection scope of the computer readable medium.

In conclusion, the foregoing descriptions are merely exemplary embodiments of the technical solutions of the present invention, but are not intended to limit the protection scope of the present invention. Any modification, equivalent replacement, and improvement made within the spirit and principle of the present invention shall all fall within the protection scope of the present invention.

What is claimed is:

1. A method for synchronization, comprising,
   sending, by a first device, a clock information acquiring request to a second device through an Antenna Interface Standards Group (AISG) interface an AISG protocol, the AISG protocol comprising a first command that indicates the clock information acquiring request, and the clock information acquiring request requesting information for performing clock synchronization;
   receiving, by the first device in response to the clock information acquiring request, a clock signal from the second device through the AISG interface using the AISG protocol, the clock signal carrying clock information for performing the clock synchronization, and the AISG protocol comprising a second command that indicates the clock information carried by the clock signal;
   performing synchronization according to the clock information received using the AISG protocol, wherein the first device is a base station and the second device is an antenna line device, or the first device is an antenna line device and the second device is a base station;
   before sending clock information acquiring request to the second device,
   sending a device capability acquiring request to the second device through the AISG interface using the AISG protocol, the AISG protocol comprising a third command indicating the device capability acquiring request, and the device capability acquiring request requesting whether the second device can provide clock information for performing the clock synchronization; and
   receiving device capability information from the second device through the AISG interface using the AISG protocol, wherein the device capability information indicates whether the second device is capable of providing the clock information.

2. The method according to claim 1, wherein the clock signal is a pulse signal or a group of pulse signals, wherein the group of pulse signals carries a time packet.

3. The method according to claim 1, further comprising: before sending the clock information acquiring,
   sending a clock source information query request to the second device through the AISG interface; and receiving clock source information from the second device through the AISG interface.

4. The method according to claim 3, wherein the clock source information includes a time at which the clock signal reaches the first device, information about a connecting pin of the first device and the second device, period information, information about whether a time packet is carried, clock source precision information, clock source state information, or a clock information validity mark.

5. The method according to claim 4, wherein receiving the clock signal comprises receiving the clock signal from the second device through the AISG interface at the time at which the clock signal reaches the first device.

6. The method according to claim 4, wherein performing the synchronization comprises performing time delay compensation based on the clock information received from the second device, so as to perform clock synchronization or performing time synchronization according to the time packet and the clock information validity mark in the received clock source information of the second device.

7. The method according to claim 1, wherein sending the clock information acquiring request comprises periodically sending the clock information acquiring request.

8. A method for synchronization, comprising:
receiving, by a second device, a clock information acquiring request from a first device through an Antenna Interface Standards Group (AISG) interface using the an AISG protocol, the AISG protocol comprising a first command that indicates the clock information acquiring request, and the clock information acquiring request requesting information for performing clock synchronization;
sending, by the second device in response to the clock information acquiring request, a clock signal to the first device through the AISG interface using the AISG protocol, wherein the clock signal carries clock information so that the first device can perform clock synchronization according to the clock information, wherein the AISG protocol comprises a second command that indicates the clock information carried by the clock signal, and wherein the first device is a base station and the second device is an antenna line device, or the first device is an antenna line device and the second device is a base station;
before receiving the clock information acquiring request,
receiving a device capability acquiring request from the first device through the AISG interface using the AISG protocol, the AISG protocol comprising a third command indicating the device capability acquiring request, and the device capability acquiring request requesting whether the second device can provide clock information for performing the clock synchronization; and
sending device capability information to the first device through the AISG interface using the AISG protocol, wherein the device capability information indicates that the second device is capable of providing the clock information.

9. The method according to claim 8, wherein the clock signal is a pulse signal or a group of pulse signals that carries a time packet.

10. The method according to claim 8, further comprising:
before receiving the clock information acquiring request from a first device,
receiving, through the AISG interface, a clock source information query request sent by the first device; and sending clock source information to the first device through the AISG interface.

11. The method according to claim 10, wherein the clock source information comprises a time at which the clock signal reaches the first device, information about a connecting pin of the first device and the second device, period information, information about whether a time packet is carried, clock source precision information, clock source state information, or a clock information validity mark.

12. A first synchronization apparatus comprising:
a transmitter that includes an Antenna Interface Standards Group (AISG) interface, wherein the transmitter is configured to send a clock information acquiring request to a second synchronization apparatus through the AISG interface using an AISG protocol, wherein the AISG protocol comprises a first command that indicates the clock information acquiring request, and the clock information acquiring request requests information for performing clock synchronization;
a receiver configured to receive a clock signal from the second synchronization apparatus through the AISG interface using the AISG protocol, wherein the clock signal carries clock information for performing the clock synchronization, and the AISG protocol comprises a second command that indicates the clock information carried by the clock signal, and wherein the clock information is received through an AISG cable;
a processor, configured to perform synchronization according to the clock information received using the AISG protocol;
the transmitter is further configured to send a device capability acquiring request to the second synchronization apparatus through the AISG interface using an the AISG protocol, the AISG protocol comprising a third command indicating the device capability acquiring request, and the device capability acquiring request requesting whether the second synchronization apparatus can provide clock information for performing the clock synchronization; and
the receiver is further configured to receive device capability information from the second synchronization apparatus through the AISG interface using the AISG protocol, wherein the device capability information indicates whether the second synchronization apparatus is capable of providing the clock information.

13. The first synchronization apparatus according to claim 12, wherein the first synchronization apparatus is a base station and the second synchronization apparatus is an antenna line device, or the first synchronization apparatus is an antenna line device and the second synchronization apparatus is a base station.

14. The first synchronization apparatus according to claim 12, wherein the receiver receives the clock signal from the second synchronization apparatus specifically by receiving a pulse signal or a group of pulse signals from the second synchronization apparatus, wherein the group of pulse signals carries a time packet.

15. The first synchronization apparatus according to claim 12, wherein
the transmitter is further configured to send a clock source information query request to the second synchronization apparatus through the AISG interface; and
the receiver is further configured to receive clock source information from the second synchronization apparatus through the AISG interface.

16. The first synchronization apparatus according to claim 15, wherein the clock source information comprises a time at which the clock signal reaches the first synchronization apparatus, information about a connecting pin of the first synchronization apparatus and the second synchronization apparatus, period information, information about whether a time packet is carried, clock source precision information, clock source state information, or a clock information validity mark.

17. The first synchronization apparatus according to claim 16, wherein the receiver is configured to receive the clock signal from the second synchronization apparatus through the AISG interface at the time at which the clock signal reaches the first synchronization apparatus.

* * * * *